April 2, 1935.   F. PORSCHE   1,996,688
UNIVERSAL JOINT FOR MOTOR VEHICLES
Filed Jan. 25, 1932
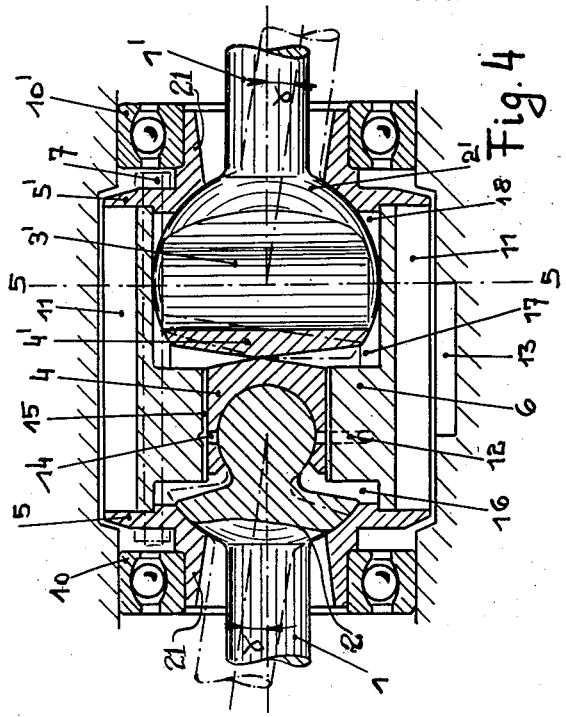
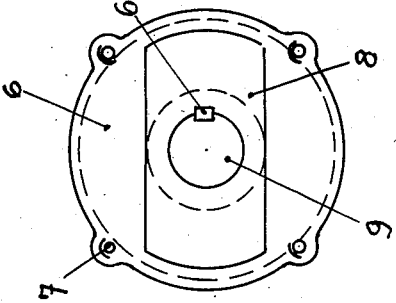
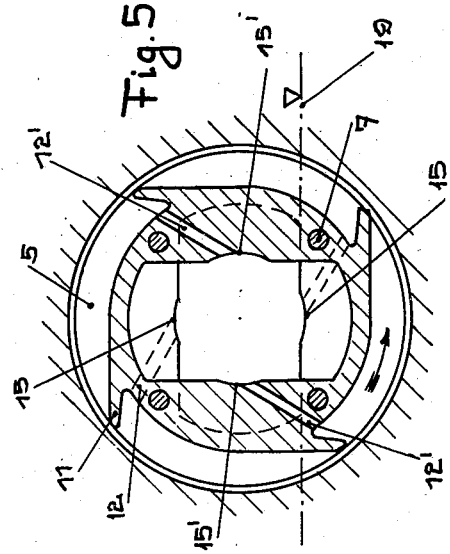
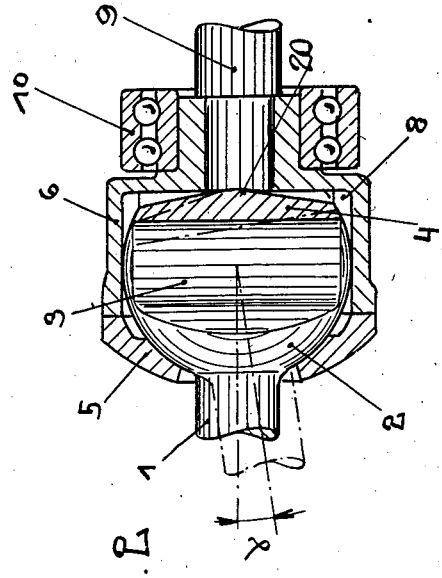
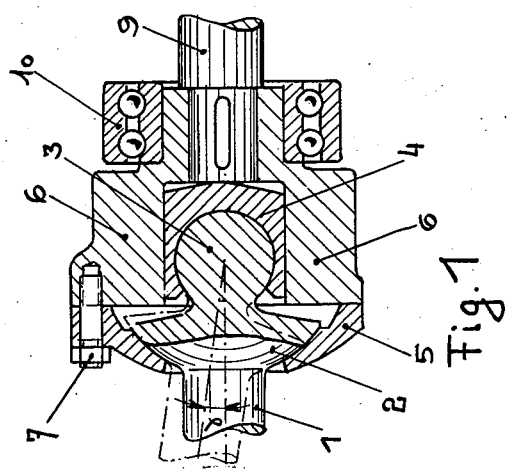
Inventor Patented Apr. 2, 1935

1,996,688

UNITED STATES PATENT OFFICE 1,996,688

UNIVERSAL JOINT FOR MOTOR VEHICLES

Ferdinand Porsche, Stuttgart, Germany

Application January 25, 1932, Serial No. 588,718
In Germany March 14, 1931

6 Claims. (Cl. 64—103)

Universal joints are known in which the shaft end is spherically enlarged and is profiled cylindrically transversely to the shaft axis so as to form practically a torsionally rigid stub. This stub rests in a socket of the joint member connected to the other shaft in such a manner that the stub end can slide along two cylinder generating lines on the opposing flat bounding surfaces of the socket of the coupling member. Independently of this, the stub end of the shaft can slide with its spherical surface in contact with the socket in such a manner that within practical limits any desired angular relation of one shaft to the other may be assumed. Two joints of this kind are combined in such a manner that an intermediate member having a stub at both ends engages coupling members of the driving and driven shafts, which members can be brought so close to each other that there is just room between them for a double stub intermediate member. This construction has the following disadvantages:

1. Only line contact can be obtained along the cylinder generators with the result that the opposing flat contact surfaces of the socket in the coupling member are overstressed and are subjected to increased wear.

2. One shaft cannot be centered relatively to the other because the stub end of one shaft is not axially restrained relatively to the coupling member of the other shaft.

3. Lubrication of the parts sliding on each other is imperfect because the lubricant introduced into the socket can flow out.

According to the present invention these disadvantages are overcome by journalling the stub end of the shaft, by means of a separate joint block, in the socket of the coupling member. This joint block embraces the stub end of the shaft along a cylindric surface open towards the shaft, and its outer flat bounding surfaces bear against the corresponding bounding surfaces of the socket in the coupling member, while the lateral bounding surfaces of the joint block coincide with the spherical lateral bounding surfaces of the stub. The stub is not joined directly to the front of the shaft, but a spherical collar formed from the original spherical enlargement of the shaft end is located intermediately with the aid of which the shaft end is both centered and sealed in the joint housing. Two such joints are combined in such a manner that their joint members are combined with each other whereby not only is the overall length of the double joint reduced to a minimum but the mode of assembly guarantees the provision of a common rotary lubrication for both joints. The ends of the two shafts are thus simultaneously axially centered with respect to each other and seal the joint housing at both ends owing to their spherical parts. The invention thus provides the following advantages over the construction first referred to.

1. Area contact between the torque transmitting parts is present to such generous extent that any substantial wear of these parts is avoided and the life as well as the strength of the joint is practically unlimited.

2. The driving shaft is exactly secured and centered relatively to the driven shaft. At the same time the delicate parts are properly enclosed and sealed, and thus are protected as much as possible from dirt.

3. The lubrication of the parts sliding in contact can be exactly accomplished, if desired positively, and only one lubricator is required for the double joint. Also it is easy to provide for a certain reserve of oil to be continuously maintained in the joint.

In the accompanying drawing, which represents by way of example two preferred forms of universal joints in accordance with the invention, Fig. 1 is a longitudinal sectional view of a simple joint, Fig. 2 is a sectional view of the joint at right angles to that shown in Fig. 1, Fig. 3 is a front view of a part of the joint shown in Fig. 1, Fig. 4 is a view in longitudinal section of a modified joint, Fig. 5 is a cross-sectional view taken on line 5—5 of Fig. 4.

In describing both modifications like parts or elements are indicated by the same or similar reference characters.

The simple joint as shown in Figs. 1, 2 and 3 consists chiefly of a shaft 1, the end of which is constructed as a spherical segment 2, and a pin portion 3 preferably integral therewith and adjacent the base of the segment. The pin 3 fits in a corresponding driving block 4, and the segment 2 fits and contacts in a corresponding ball cup or cover 5 which is constructed as a cover for the coupling member 6 and which is secured on the coupling member by means of screws 7. The driving block 4 is provided in a recess 8 of the member 6 at right angles to the pin 3, and has its central back surface 20 in rolling contact with the end surface of the shaft 9. The member 6 is secured on the end of the shaft 9 by means of the key 6' and is provided with a ball bearing 10.

This joint operates as follows: The shaft 1 may rotate its entire 360° at the angle α shown by the dot and dash lines in Figs. 1 and 2. It cannot be moved in the longitudinal direction for the reason that it contacts against the cover 5 by means of the segment 2 and against the driving block 4. Fig. 1 clearly shows that the shaft 1 may swing through an angle to an extent indicated by α around the center point on the axis of the pin 3 as a center, and Fig. 2 shows the same angle with the pin in a vertical position around the center of the sphere of the segment 2. In the intermediate position the same angle may be attained by swinging at the same time around the center point of the axis of the pin and the center of the segment. In all positions the actual center around which the shaft 1 rotates relative to the shaft 9 is always the same point.

The double joint shown in Figs. 4 and 5 consists of the shaft 1, which is constructed in exactly the same manner as in Figs. 1 and 2 and which is provided in a recess in the coupling member 6 by means of the driving block 4. The shaft 1' operates in exactly the same manner as the shaft 1 with the only exception that the axis of its pin portion 3' is provided on an axis which is at 90° to the axis of the pin 3. The shaft 1' has its portion 3' in the driving block 4' which is in the member 6 in exactly the same manner as portion 3. Therefore, the joints 4 and 4' roll and contact along their back surfaces while the spherical segments 2 and 2' contact against corresponding ball cups or covers 5 and 5' thus permitting the shafts to swing in all directions. These cups 5 and 5' serve at the same time as covers since they are connected to the member 6 by means of screws 7. The cover or cup 5 has a collar-like extension on which the ball bearings 10 and 10' are provided.

The double joint of Figs. 4 and 5 operates in the same manner as the simple joint of Figs. 1 to 3 with the only exception that both shafts can rotate around their center positions independent of each other without influencing the centering in the longitudinal direction. The axis of the pin portions 3 and 3' are at 90° angles from each other but any other angle may be adapted if desired.

In Figs. 4 and 5 an arrangement for lubrication is provided. The periphery of the member 6 has paddle-like ribs 11 from the ends of which oil channels 12 and 12' lead into the interior of the member 6 and reach the sliding surfaces of the driving block 4 and 4'. If the member 6 is permitted to run in an oil pool 13, the ribs 11 will draw the oil therefrom and force it through the channels 12 and 12' into the interior, whereby a continual lubrication of the sliding surfaces of the driving blocks 4 and 4' is attained. The oil runs through the bore holes 14 and 14' to the sliding surfaces of the pins 3 and 3', and also through the grooves 15 and 15' outward where it is forced into the chambers 16, 17 and 18, to thereby provide a continual lubrication of all parts of the joints. A joint if lubricated in this way will permit a greater superficial pressure, and thus it will withstand a greater moment of transmission. The oil quantity is governed in such a way that when the joint is stationary the oil can only run out of the interior of the member 6 when it reaches the level 19 (Fig. 5), so that there is always a certain quantity of oil in the joint.

If the driving block is made of soft but tough material, e. g., asbestos, fibre, jurid, rubber, the superficial pressure might be taken practically as low as to neglect the lubrication. Such a joint operates absolutely dry.

There is no change whatever of the invention if the driving block is divided. It can be divided, e. g., in the plane vertical to that shown on the drawing in Fig. 1, due to the ease of treatment of the material. It can also be divided in the symmetry plane vertical to the plane of Fig. 3.

I claim as my invention:

1. A universal joint particularly for motor vehicles, comprising a shaft, a pin portion at one end, and a spherical segment adjacent to the pin portion; a driving block for the pin portion; a second shaft; a coupling member keyed on the second shaft and having a recess therein in which the block is mounted; and a cover for the coupling member having a surface corresponding to and in contact with the spherical segment, said driving block abutting against the end of the second shaft and being adapted to roll thereon and the spherical segment to slide on the surface of the cover when the first-named shaft changes its angular position.

2. A universal joint particularly for motor vehicles, comprising a shaft, a pin portion at one end, and a spherical segment adjacent to the pin portion; a driving block for the pin portion; a second shaft; a coupling member mounted on the second shaft and having the driving block movably mounted therein; and a cover for the coupling member having a surface corresponding to and in contact with the spherical segment, the movement of the driving block and the spherical segment sliding on the surface of the cover permitting the angular movement of the first-mentioned shaft from its longitudinal axis.

3. A universal joint particularly for motor vehicles, comprising a pair of shafts each having a pin portion at one end and a spherical segment adjacent the pin portion; a coupling member; a pair of driving blocks in the coupling member, one on each pin portion, and being adapted to contact and roll back to back on each other; and a cover for each end of the coupling member and each cover having a surface corresponding to and in contact with the spherical segment, the rolling of the driving blocks and the sliding of the spherical segment on its surface permitting angular movement of the shafts relative to their longitudinal axes.

4. A universal joint according to claim 3, in which a plurality of ribs is provided on the periphery of the coupling member and in which oil channels are provided in the coupling member to the driving blocks so that the oil will be guided to the sliding surfaces between the coupling block and the driving blocks and between the driving blocks and the pin portions.

5. A universal joint according to claim 3, in which a plurality of ribs is provided on the periphery of the coupling member and in which oil channels are provided in the coupling member to the driving blocks so that the oil will be guided to the sliding surfaces between the coupling block and the driving blocks and between the driving blocks and the pin portions, the channels having grooves which are adjacent the shafts so that a quantity of oil will be maintained in the joint when it is stationary.

6. A universal joint particularly for motor vehicles, comprising a shaft, a pin portion at one end, and a spherical segment adjacent to the pin portion; a driving block for the pin portion; a second shaft; a coupling member in rotational drive connection with both shafts and having a recess therein in which the block is mounted; and a cover for the coupling member having a surface corresponding to and in contact with the spherical segment, said driving block abutting against the end of the second shaft and being adapted to roll thereon and the spherical segment to slide on the surface of the cover when the first-named shaft changes its angular position.

FERDINAND PORSCHE.